Patented Apr. 27, 1948

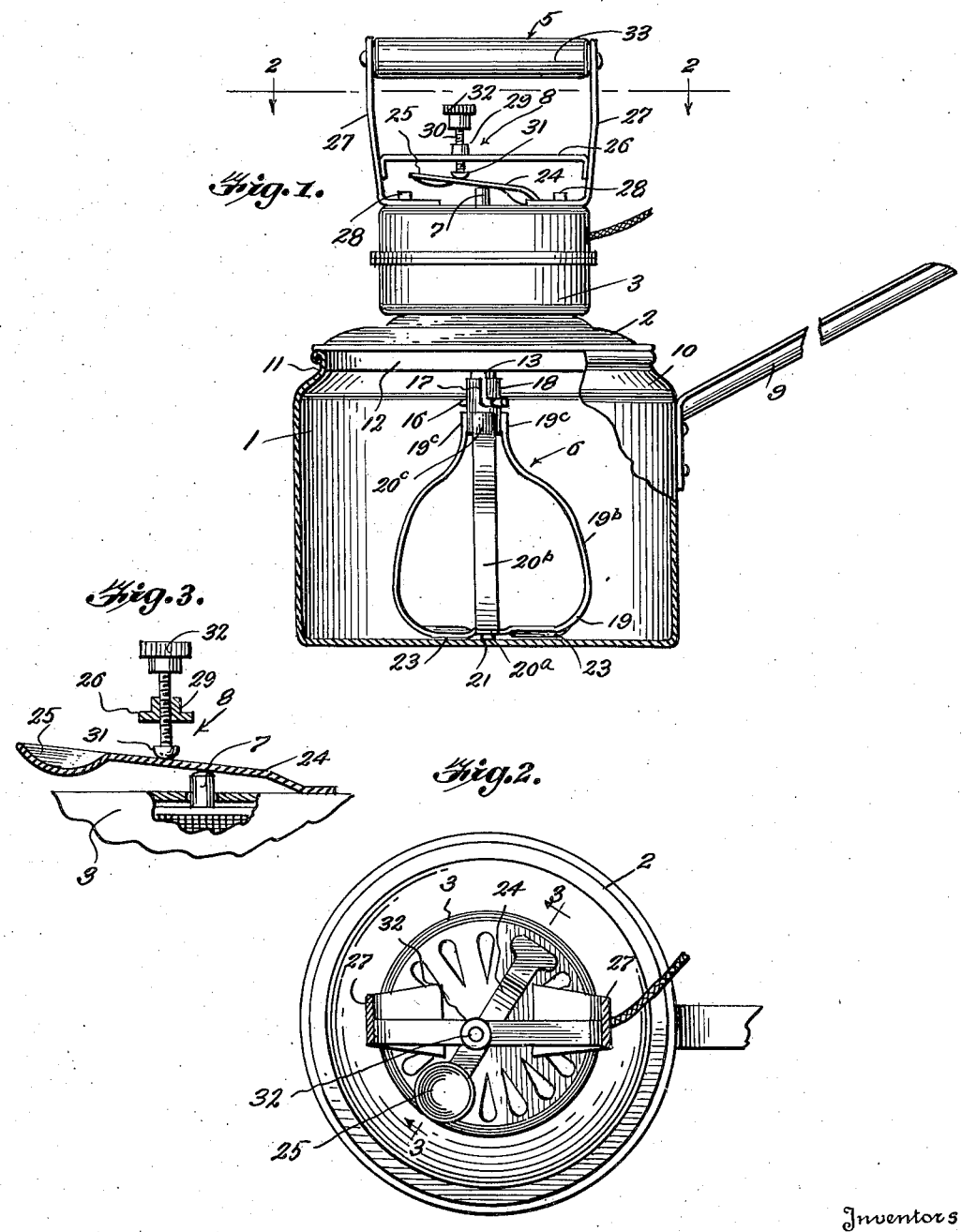

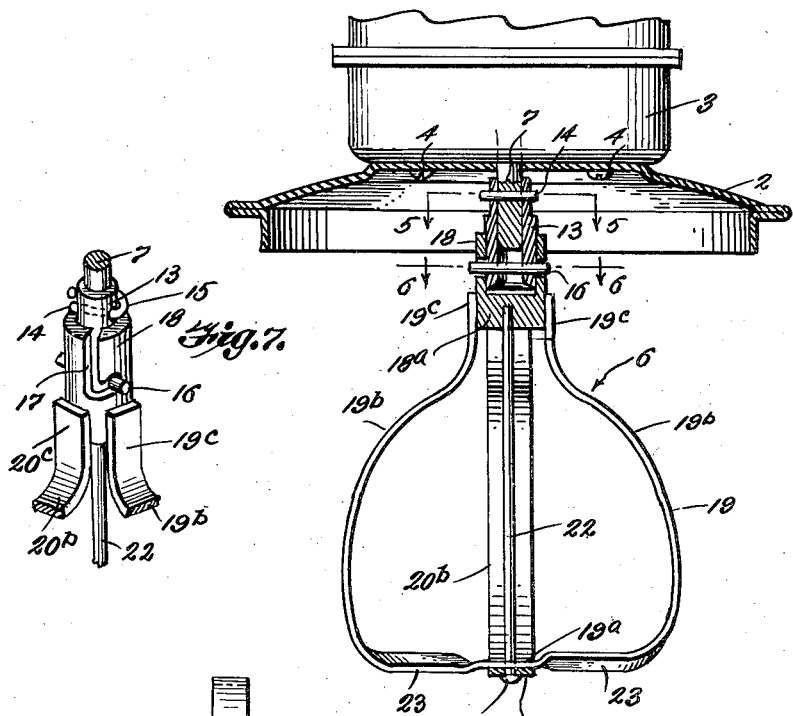
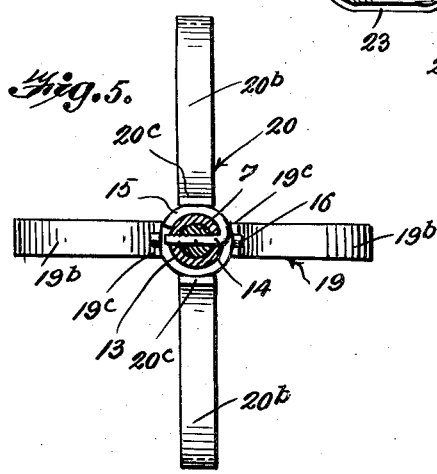
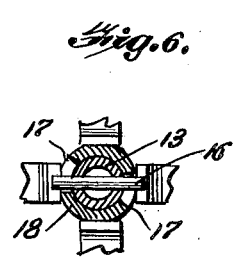

2,440,322

UNITED STATES PATENT OFFICE 2,440,322

HAND MOTOR WITH MANUALLY OPERATED BRAKE

William G. Barcroft and Mabel L. Maas, Boulder, Colo.

Application May 29, 1945, Serial No. 596,552

3 Claims. (Cl. 172—36)

This invention relates to an improved kitchen utensil and it is one object of the invention to provide a utensil in which material may be cooked and the material stirred and its ingredients thoroughly mixed before and during cooking. It will thus be seen that the ingredients of the material may be thoroughly intermingled and kept in motion and thus prevented from being scorched or burnt during cooking.

Another object of the invention is to provide an implement including a container and a cover therefore carrying a motor which is firmly secured upon the upper surface of the cover and has its shaft extending downwardly through the cover and carrying an agitator which is so shaped and so located within the container that contents thereof will be thoroughly agitated when the agitator is in operation.

Another object of the invention is to provide an agitator so connected with the lower end portion of the motor shaft that it will be detachably held in place thereon and be easily removable but not liable to accidentally slip loose.

Another object of the invention is to provide the agitator or beater with blades of special formation, one being larger than the other and the smaller one having portions disposed at such an angle that they will cause material to be slowly moved upwardly from the bottom of the container and thus prevented from being scorched.

Another object of the invention is to provide the motor with an upstanding handle by means of which the cover carrying the motor may be lifted from the container, there being also provided means for controlling the speed of the motor.

Another object of the invention is to provide speed controlling mechanism including a lever carried by the motor and so disposed that the thumb of a hand grasping the handle may be readily applied to the lever and downward pressure applied to create frictional binding and check rotation of the motor shaft.

Another object of the invention is to provide the speed controlling mechanism with a set screw disposed over the lever and having its lower end engaging the lever so that by adjusting the screw the lever may be shifted to adjusted position where it disposes the screw in position for applying predetermined pressure upon the upper end of the motor shaft.

In the accompanying drawings:

Fig. 1 is a view showing the improved cooker and mixer partially in side elevation and partially in vertical section.

Fig. 2 is a view on the line 2—2 of Fig. 1.

Fig. 3 is a fragmentary sectional view of the speed controlling mechanism.

Fig. 4 is a view on an enlarged scale showing the agitator, the motor, and the cover partially in side elevation and partially in vertical section.

Fig. 5 is a view on the line 5—5 of Fig. 4, looking down on the agitator.

Fig. 6 is a transverse sectional view on the line 6—6 of Fig. 4.

Fig. 7 is a perspective view showing the coupling for detachably connecting the agitator with the motor shaft.

This improved cooker and stirrer includes briefly, a container 1, a cover 2, a motor 3 secured to the cover by screws 4, a handle 5 carried by the motor, an agitator 6 detachably carried by the lower end portion of the motor shaft 7 and disposed within the container 1, and speed controlling mechanism 8 associated with the handle and the upper end of the motor shaft so that a person grasping the handle may adjust the mechanism to regulate the speed at which the motor shaft will rotate.

The container 1 is of conventional formation and has a handle 9 by means of which it may be lifted when placing it upon a stove or removed therefrom. The upper portion 10 of the container has been shown constricted and terminates in a mouth or neck 11 for engagement by the cover 2 and, since the depending portion 12 of the cover fits within the neck 11, the cover will be prevented from shifting transversely out of place when applied to the container. It will be understood that this merely illustrates one specific form of container and cover and that the invention is not restricted to the particular form of container and cover illustrated.

The motor 3 is of conventional construction and has the lower end portion of its shaft 7 projecting downwardly through an opening at the center of the cover and its upper end portion projecting upwardly for engagement by the speed controlling mechanism. A sleeve or coupling 13 fits about the lower portion of the motor shaft where it is secured by a pin 14 formed from a wire strand having a portion 15 bent about the sleeve to hold the pin in place and prevent it from slipping out of the registering openings formed transversely through the sleeve and motor shaft. A pin 16 passes diametrically through the lower end portion of the sleeve below the lower end of the motor shaft, as shown in Fig. 4, and this pin is fixedly carried by the sleeve and is of such length that its ends project from opposite sides of the sleeve. Therefore, the protruding ends of the pin 16 may engage in the bayonet slots 17 formed in the head or socket 18 of the agitator and detachably hold the agitator in engagement with the coupling sleeve.

The agitator has beaters 19 and 20 formed from strips of sheet metal which are each bent to form a lower bridge 19a or 20a and arcuate arms 19b or 20b extending upwardly therefrom with their upper end portions brought toward each other and then bent upwardly to form attaching portions or shanks 19c or 20c which are welded or otherwise firmly secured against the socket, as clearly shown in Figs. 4 and 6. The beater 19 is smaller than the beater 20 and its bridge portion is bent, at opposite sides of the point at which it is secured in crossing relation to the bridge of the beater 20 by the head 21 of the vertically extending rod 22, to form transversely pitched blades 23 which serve to impart upward movement to material at the bottom of the container and thus eliminate any danger of some of the material remaining at the bottom of the container and becoming scorched. The upper end of the rod 22 is mounted through the center of the socket 18 to firmly hold the rod in place and prevent downward distortion of the beaters and it should be noted that the lower portion 18a of the socket is solid and substantially thicker than its upstanding annular wall to provide a good mounting for the rod and upper ends of the beaters. This is clearly shown in Fig. 4.

During operation of the mixer, the speed at which the motor shaft turns must be regulated and, in order to do so, the person using the cooker adjusts the speed controlling mechanism 8. This mechanism includes a lever 24 which is formed from a strip of resilient sheet metal and has one end welded against the upper end of the casing of the motor 3. The lever extends diametrically of the motor and across the upper end of the motor shaft 7 and, at its free end, is formed with a downwardly depressed concavo-convex head or thumb engaging member 25. The lever extends under a cross bar or bridge 26 carried by and extending between the arms 27 of the handle 5, the arms being formed of metal and having their lower end portions bent inwardly and secured against the top of the motor casing by fasteners 28. A bearing 29 which is internally threaded, is formed intermediate the length of the bridge 26 and through this bearing passes a screw 30 which has a rounded head 31 at its lower end for engaging the upper surface of the lever. At its upper end, the screw carries a knob 32 formed of insulation and located under the wooden hand grip 33 of the handle in such position that the fingers of a hand grasping the hand grip may engage the knob and thereby turn the screw for adjusting the screw vertically. The thumb engaging free end portion 25 of the lever is located at one side of the bridge in such position that when a person is grasping the hand grip, his thumb may be moved downwardly and apply pressure to flex the lever downwardly and apply pressure to the upper end of the motor shaft. As the lever engages the upper end of the motor shaft, frictional braking action is created and the speed at which the motor shaft rotates will be reduced. By gradually increasing the pressure upon the lever, the speed of the motor shaft may be progressively reduced until the desired speed is attained. The screw 30 will then be screwed downwardly until the lower end engages the upper face of the lever and holds the lever against upward movement. If desired, downward movement of the lever may be effected solely by means of the screw or, if it is desired to have intermittent increases and reductions in the speed of the motor shaft, the lever may be alternately depressed and raised by action of the thumb resting upon the free end of the lever.

As the motor shaft turns the agitator will be turned with it and when the handle is grasped and upward pull exerted to remove the cover from the container the agitator will be removed therewith. If the cover and the agitator are to be only temporarily removed, the marginal edge of the cover and the hand grip 33 may be set at rest upon a table and the handle, by resting upon the table, will prevent the cover from rolling to the edge of the table and dropping upon the floor. If the cooking operation is finished, or use of the mixer is no longer desired, the socket will be disengaged from the pin 16 and the socket slid out of engagement with the sleeve. The agitator or mixer may then be thoroughly cleaned and put away.

Having thus described the invention, what is claimed is:

1. In a device of the character described, a support, a motor on said support including a vertical shaft having protruding upper and lower portions, a handle extending upwardly from said motor and having side arms mounted upon the motor and a hand grip between upper portions of the side arms, a cross bar extending horizontally between the side arms and spaced from the motor and the hand grip, a yieldable lever carried by said motor and extending transversely of the motor and under the cross bar and across the upper end of the motor shaft with a free end protruding from one side of the cross bar in position for engagement by the thumb of a hand grasping the hand grip whereby the lever may be depressed and pressure applied to the motor shaft to frictionally check the speed at which the shaft rotates, and means carried by the cross bar for forcing the lever downwardly and holding the lever in position for frictionally engaging the shaft.

2. In a device of the character described, a support, a motor on said support including a vertical shaft having protruding upper and lower portions, a handle extending upwardly from said motor and having side arms fixed to the motor and a hand grip extending horizontally between upper portions of the side arms, a horizontal cross bar carried by the side arms and spaced from the motor and the hand grip, a yieldable lever carried by said motor and extending diametrically of the motor and under the cross bar transversely thereof and across the upper end of the motor shaft and having a free end protruding from one side of the cross bar in position for engagement by the thumb of a hand grasping the hand grip whereby the lever may be depressed by the thumb and pressure applied to the motor shaft to check the speed at which the shaft rotates, and a screw threaded vertically through the cross bar and having a turning knob at its upper end and a head at its lower end for engaging the upper face of the lever adjacent the free end thereof and shifting the lever downwardly into engagement with the shaft when the screw is turned in a direction to shift it downwardly through the cross bar.

3. In a device of the character described, a support, a motor on said support including a vertical shaft having protruding upper and lower portions, a handle extending upwardly from said motor and having a grip extending diametrically of the motor, a lever carried by said motor and extending transversely of the handle under the hand grip and across the upper end of said shaft with its free end projecting from a side of the handle in position to be depressed by the thumb of a hand grasping the hand grip, and a screw carried by said handle for engaging said lever adjacent the free end thereof and applying downward pressure to the lever and shifting the lever downwardly into engagement with the upper end of the shaft for frictionally resisting rotation of the shaft.

WILLIAM G. BARCROFT.
MABEL L. MAAS.

REFERENCES CITED

The following references are of record in the file of this patent:

UNITED STATES PATENTS

| Number | Name | Date |
| --- | --- | --- |
| 1,085,858 | Fulton | Feb. 3, 1914 |
| 1,359,208 | Viers | Nov. 16, 1920 |
| 1,536,203 | Frydenlund | May 5, 1925 |
| 1,710,417 | Goodell | Apr. 23, 1929 |
| 2,048,455 | Knapp | July 21, 1936 |
| 2,250,142 | Umstead | July 22, 1941 |